United States Patent
Koyanagi

(10) Patent No.: US 7,297,387 B2
(45) Date of Patent: Nov. 20, 2007

(54) AIR-FILLING CUSHIONING MATERIAL AND METHOD FOR MANUFACTURING THE SAME

(75) Inventor: Yoshihiro Koyanagi, Kashiwara (JP)

(73) Assignee: Kashiwara Seitai Co., Ltd., Kashiwara-shi, Osaka (JP)

( * ) Notice: Subject to any disclaimer, the term of this patent is extended or adjusted under 35 U.S.C. 154(b) by 0 days.

(21) Appl. No.: 10/891,020

(22) Filed: Jul. 15, 2004

(65) Prior Publication Data

US 2005/0013974 A1    Jan. 20, 2005

(30) Foreign Application Priority Data

Jul. 16, 2003    (JP) .............................. 2003-197651

(51) Int. Cl.
*B32B 3/00* (2006.01)
*B65D 30/00* (2006.01)
*B65D 81/03* (2006.01)

(52) U.S. Cl. .................... 428/166; 428/178; 383/3; 229/87.02; 206/484; 206/522

(58) Field of Classification Search ............. 428/166, 428/178, 188; 206/484, 591; 229/87.02, 229/87.03; 383/3
See application file for complete search history.

(56) References Cited

U.S. PATENT DOCUMENTS

| | | | | | |
|---|---|---|---|---|---|
| 4,169,002 | A | * | 9/1979 | Larson | 156/145 |
| 4,422,194 | A | * | 12/1983 | Viesturs et al. | 5/686 |
| 5,824,392 | A | * | 10/1998 | Gotoh et al. | 428/178 |
| 6,423,166 | B1 | * | 7/2002 | Simhaee | 156/156 |
| 2002/0064319 | A1 | * | 5/2002 | Tanaka et al. | 383/3 |

FOREIGN PATENT DOCUMENTS

JP          07-285581        7/2003

* cited by examiner

*Primary Examiner*—Donald J. Loney
(74) *Attorney, Agent, or Firm*—Birch, Sewart, Kolasch & Birch, LLP

(57) ABSTRACT

The present invention provides an air-filling cushioning material which can sufficiently inflate cells and, in addition, which can hold the crease of the fold when being formed into a three-dimensional configuration. An air-filling cushioning material 1, in which a plurality of cells 2 having an air-fillable space are formed by adhering overlapped flexible sheets 1a, 1b at predetermined spots wherein one sheet 1a is flat while the other sheet 1b is molded beforehand into a configuration of the cells 2 in inflation at the position where the cells 2 are to be formed. Therefore, there is no such problem, as in the conventional case where the cells are formed by tucking the other sheet, the cells cannot inflate well. The cells 2 formed on the other sheet 1b can inflate sufficiently into a configuration as molded.

7 Claims, 9 Drawing Sheets

F I G 4 (A)
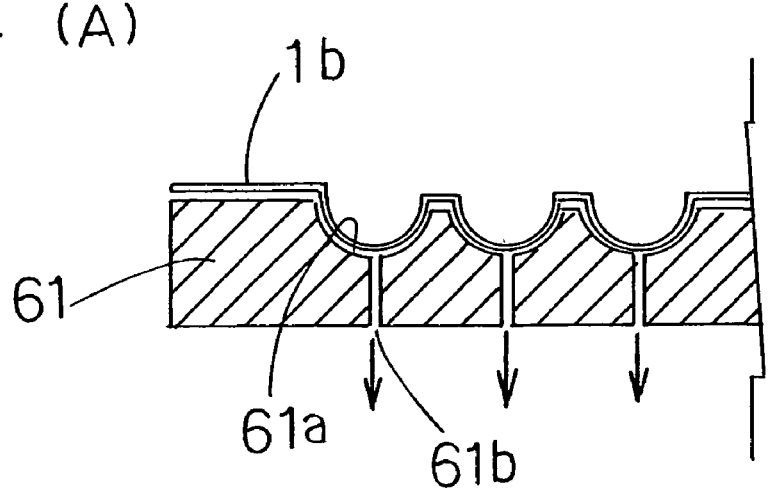
F I G 4 (B)
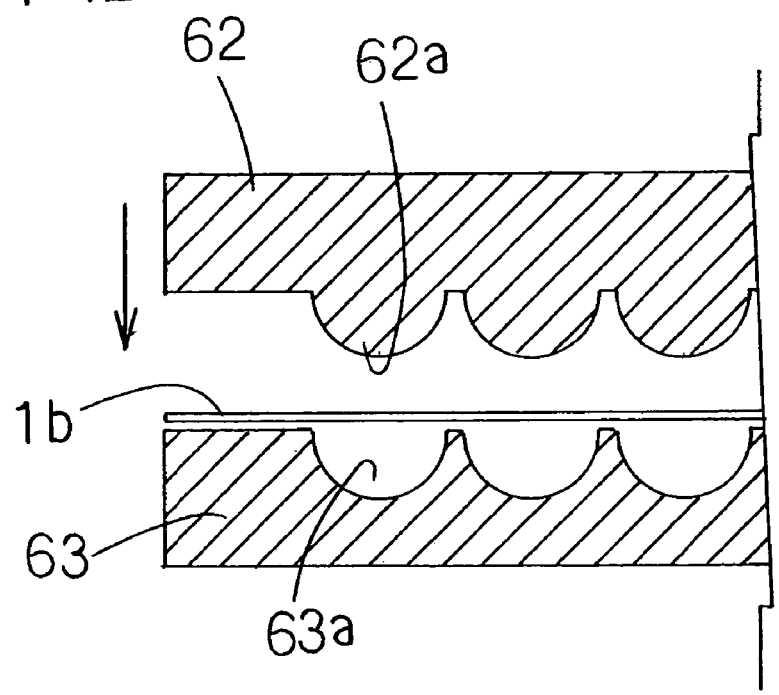

AIR-FILLING CUSHIONING MATERIAL AND METHOD FOR MANUFACTURING THE SAME

This Nonprovisional application claims priority under 35 U.S.C. § 119(a) on patent application No(s). 2003-197651 filed in Japan on Jul. 16, 2003, the entire contents of which are hereby incorporated by reference.

BACKGROUND OF THE INVENTION

1. Field of the Invention

The present invention relates to an air-filling cushioning material for packing an article to be protected without damaging.

2. Description of Background Art

Conventionally, an air-filling cushioning material manufactured by overlapping soft resin sheets and forming a portion having a space where air can be filled between the sheets has been widely used. By bringing the whole or part of the article to be protected in contact with the air-filling portion of the air-filling cushioning material, the article can be protected against an external shock.

As an example of such an air-filling cushioning material as described above, an air-filling cushioning material by the applicant of the present application as disclosed in Japanese Published Unexamined Patent Application No. H07-285581 (referred as patent literature 1 later) has been proposed. According thereto, cells of air-filling portions are formed in a sectioned manner by adhering airtight soft resin sheets. An article brought in contact with the air-filling cushioning material is protected by a cushioning effect of the cells where air is filled.

Herein, this air-filling cushioning material is structured so that, compared to one side thereof, the other side inflates larger when air is filled in the cells. Since the surface of the one side of the air-filling cushioning material can be maintained nearly flat, this is an advantage when the same is used for an envelop or the like with a cushioning effect.

In this air-filling cushioning material, a flat sheet is used for one of the overlapped sheets, and the other sheet is stuck to the first sheet in a slackened state, whereby cells are formed. Concretely, the other sheet 101b is tucked or pleated as shown in FIG. 9.

At an end portion S of the air-filling cushioning material, this tucked part in a tucked state and one sheet 101a and the other sheet 101b are integrally adhered. So, the end portions of the cells 102 do not inflate well, remaining in a tucked state even when air is filled in the cells 102.

Also, in a case where the air-filling cushioning material formed as in the above is folded so as to cross the cells 102 into a three-dimensional configuration such as an envelop, if the fold is formed by simple folding, the crease of the fold may not keep its shape due to the air filled in the cells 102.

In some cases, heat-sealing, or forming a spot seal in other words, is partially applied in the cells 102. When a resin layer without heat-sealabiltiy is used for the outermost layer of multiple resin layers in the other sheet 101b, a spot seal can be formed in the spot shown as P1 in the drawing. In the tucked area, however, a spot seal cannot be formed in the spot P2 where a resin layer without heat-sealability is tucked and overlapped.

SUMMARY AND OBJECTS OF THE INVENTION

In view of the above-described problem, it is an object of the present invention to provide an air-filling cushioning material where the cells can fully inflate and, in addition, the fold can hold its crease in being formed into a three-dimensional configuration.

In order to achieve the above-described object, a first aspect of the present invention provides an air-filling cushioning material in which a plurality of cells 2 having an air-fillable space are formed by adhering overlapped flexible sheets 1a, 1b at predetermined spots. Of the overlapped sheets 1a, 1b, one sheet 1a is flat while the other sheet is molded beforehand into a configuration of the cells 2 in inflation at the position where the cells 2 are to be formed. The air-filling cushioning material comprises an air passage 3 for connecting the outside of the air-filling cushioning material 1 and the cells 2, and a closing means 3a for closing the air passage 3.

A second aspect of the present invention provides the air-filling cushioning material according to the first aspect, wherein a cell-to-cell air passage 2a is provided between the cells 2. This cell-to-cell air passage 2a where one sheet 1a and the other sheet 1b stay non-adhered does not relatively expand when air is filled in the cells 2. Therefore, it is easy to fold the sheets 1a, 1b at the cell-to-cell air passage 2.

A third aspect of the present invention provides an air-filling cushioning material by use of the air-filling cushioning material 1 according to the first or second aspect, wherein the air-filling cushioning material is formed into a three-dimensional configuration so that one sheet 1a may be disposed at the outer side and the other sheet 1b may be disposed at the inner side. The outer dimension in the three-dimensional configuration does not change in either case where the cells 2 are filled with air or not.

A fourth aspect of the present invention provides the air-filling cushioning material according to the third aspect, wherein a writable covering material such as paper is provided on at least part of the outer surface side of one sheet 1a.

A fifth aspect of the present invention provides the air-filling cushioning material according to any of first to fourth aspects, wherein a check valve 3a is provided in the air passage 3. The check valve permits an air-flow from the outside of the air-filling cushioning material 1 to the cells 2 and checks an air-flow in a reverse direction to the above.

A sixth aspect of the present invention provides a method for manufacturing an air-filling cushioning material in which a plurality of cells 2 having an air-fillable space are formed by adhering flexible sheets 1a, 1b at predetermined spots, the sheets being sequentially fed and overlapped before adhesion. The method comprises the steps of: forming on the other sheet 1b a three-dimensional portion A that is expanded into a configuration of the cells 2 in inflation; overlapping the flat one sheet 1a and the other sheet 1b where said three-dimensional portion A have been formed, so that the expansive part of the three-dimensional portion A may be positioned at a front side; and deforming the other sheet 1b so that an internal volume V of the three-dimensional portion A may be reduced.

Here, the order of the respective steps in the present invention is not limited to the above-described order. In particular, the step of overlapping one sheet 1a and the other sheet 1b and the one in which the other sheet 1b is deformed can be interchanged as appropriate.

In the present invention, one sheet 1a is flat while the other sheet 1b is beforehand molded into a configuration of the cells 2 in inflation at the position where the cells 2 are to be formed. Thus, contrary to the conventional case where the cells are formed by tucking or pleating the other sheet so that the cells cannot inflate well, the cells 2 can inflate sufficiently into a configuration as molded.

In the second aspect of the present invention, even when the cells 2 are filled with air, it is easy to fold the respective sheets 1a, 1b at the cell-to-cell air passage 2a that is formed not to relatively expand to the cells 2. Furthermore, unlike the conventional art where the crease may lose due to filling of air, the fold can hold its appearance. In addition, it is not necessary to form a spot seal as a fold.

In the third aspect of the present invention, the air-filling cushioning material is formed into a three-dimensional configuration so that one sheet 1a may be disposed at the outer side and the other sheet 1b may be disposed at the inner side, and the outer dimension in the three-dimensional configuration does not change in either case where the cells 2 are filled with air or not. Therefore, in a three-dimensional cushioning material 7b formed in accordance with the inner shape of a box member X such as a corrugated cardboard case inside which the cushioning material is disposed, the three-dimensional cushioning material 7b can be disposed tight to the box member X. In the conventional air-filling cushioning material formed into a three-dimensional configuration, it is necessary to determine the dimension in anticipation of the cells in inflation.

In the sixth aspect of the present invention, a step of deforming the other sheet 1b so as to reduce the internal volume V of the three-dimensional portion A in a method of manufacturing an air-filling cushioning material, can release as much the air as the reduced internal volume out of the cells 2. This can eliminate a problem in processing the air-filling cushioning material 1 into a three-dimensional configuration, or in shipping the same without filling air in the cells 2.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 3 are explanatory drawings of sectional views showing cells of an air-filling cushioning material of the present embodiment, wherein

FIGS. 4(A) and 4(B) are both explanatory drawings of sectional views showing a die-molding step of the other sheet of an air-filling cushioning material of the present embodiment;

DESCRIPTION OF THE PREFERRED EMBODIMENTS

Hereinafter, an embodiment of an air-filling cushioning material according to the invention will be described together with the drawings.

For the material of an air-filling cushioning material 1 of this invention, used are airtight sheets 1a, 1b which are deformable responding to when air is filled therein. In the present embodiment, soft resin sheets, concretely, two sheets of a multi-layer structure by way of sticking polyethylene, non-stretch nylon or the like together are used. These sheets 1a, 1b are different in the configuration each other as described in the following.

Figure 1:
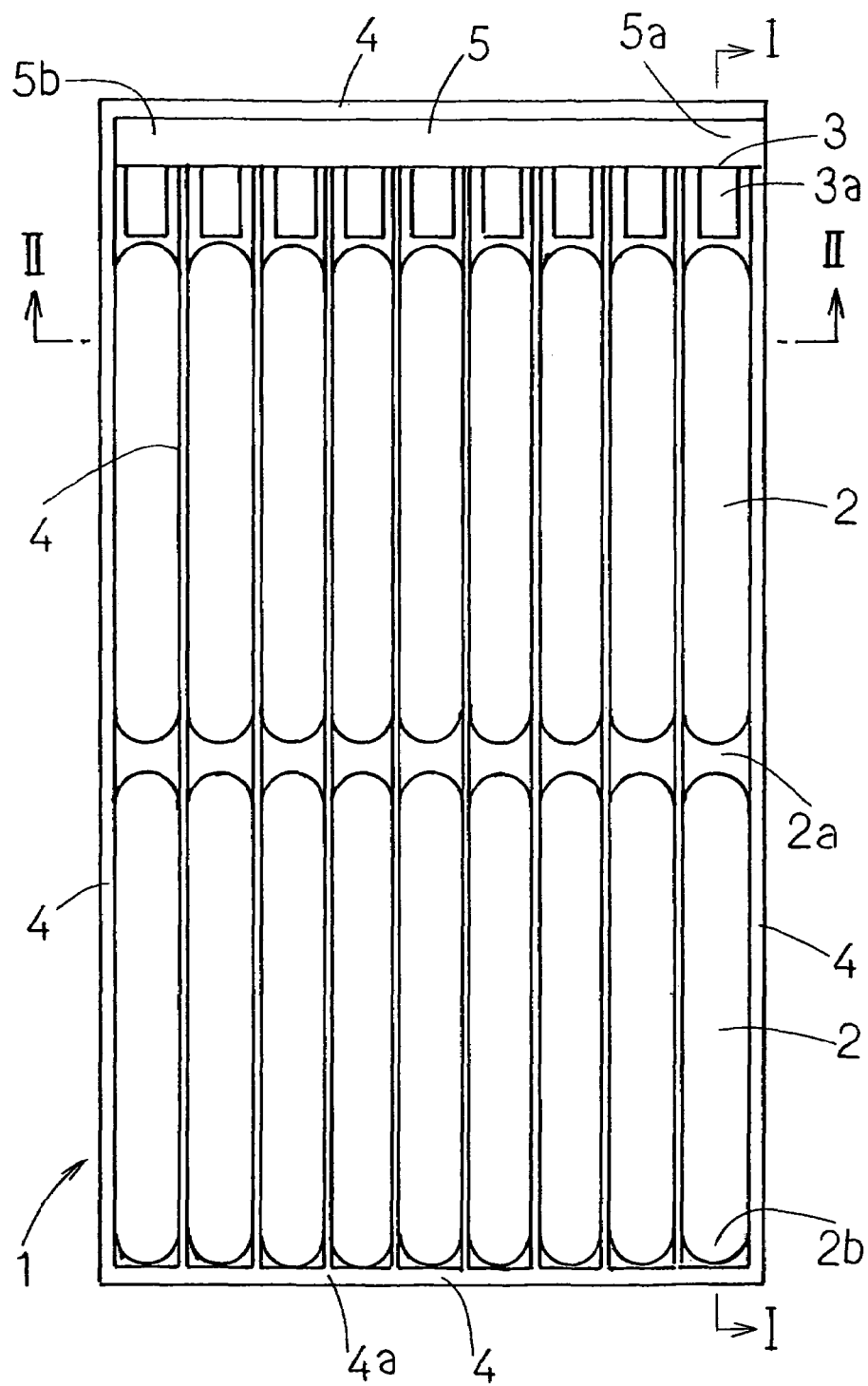
FIG. 1 is a plan view showing an air-filling cushioning material with a planar form according to an embodiment of the present invention.

These sheets 1a, 1b being overlapped, seals 4 are formed thereon at a plurality of spots by means of heat-sealing or the like, thereby, as shown in FIG. 1, portioning the planar air-filling cushioning material 1 into a plurality of cells 2 paralleled in the horizontal direction and an air-feeding path 5 positioned above in the drawing and communicating with the cells 2.

The cells 2 formed in the present embodiment as shown in FIG. 1 are strip-like cells that are long and thin in the vertical direction and are adjacent to each other in the horizontal direction. The cells 2 in the horizontal direction are separated from each other by seals 4, whereas no seals 4 are formed between the cells 2 in the vertical direction, communicating each other via a cell-to-cell air passage 2a. This will be described later.

Of the two sheets, one sheet 1a and the other sheet 1b are different in the configuration. A flat rectangular sheet in a planar view is used for the sheet 1a in the present embodiment.

In the other sheet 1b, a three-dimensional portion A where the cells 2 are formed is molded beforehand into a configuration of the cells 2 that are in inflation filled with air. A concrete example of this molding is, as shown in FIG. 4(A), to bring the other sheet 1b heated up to a plastic state in contact with a vacuum mold 61, then deaerate the air in the space between the molding concavity 61a of the vacuum mold 61 and the other sheet 1b via a deaerating passage 61b. Another example is, as shown in FIG. 4(B), to place the other sheet 1 heated up to a plastic state between an upper mold 62 having a molding convexity 62a and a lower mold 63 having a molding concavity 63a, then sandwich the other sheet 1b by the upper mold 62 and the lower mold 63. Other means, however, may be employed as long as a molding is carried out in accordance with the configuration of the cells 2 in inflation by bringing the other sheet 1b heated up to a plastic state in contact with a molding die.

Herein, when the flat sheet 1a and the other sheet 1b with a three-dimensional portion A molded as described above are stuck together, air may remain slightly in the cells 2. In some cases, this will cause a problem in processing an air-filling cushioning material 1 into a three-dimensional configuration or in shipping the same without filling air in the cells 2.

For prevention thereof, the other sheet 1b is deformed by squashing or folding to reduce the internal volume V of the three-dimensional portion A. This internal volume V means, as shown in FIG. 5(E), an internal volume of a space surrounded by the three-dimensional portion A and an extended surface B' of a flat portion B.

Figure 3A:
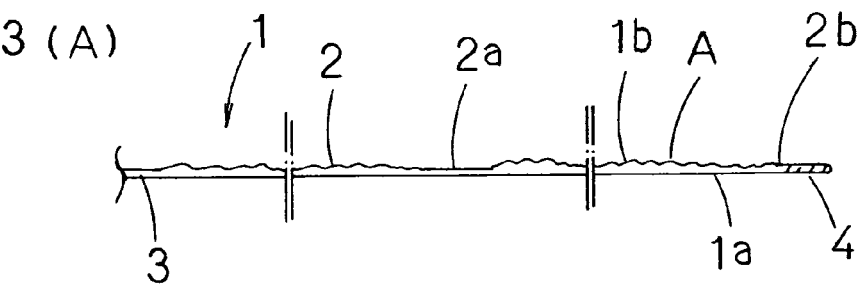
FIG. 3(A) is a sectional view along I-I of FIG. 1 before air-filling.
Figure 5:
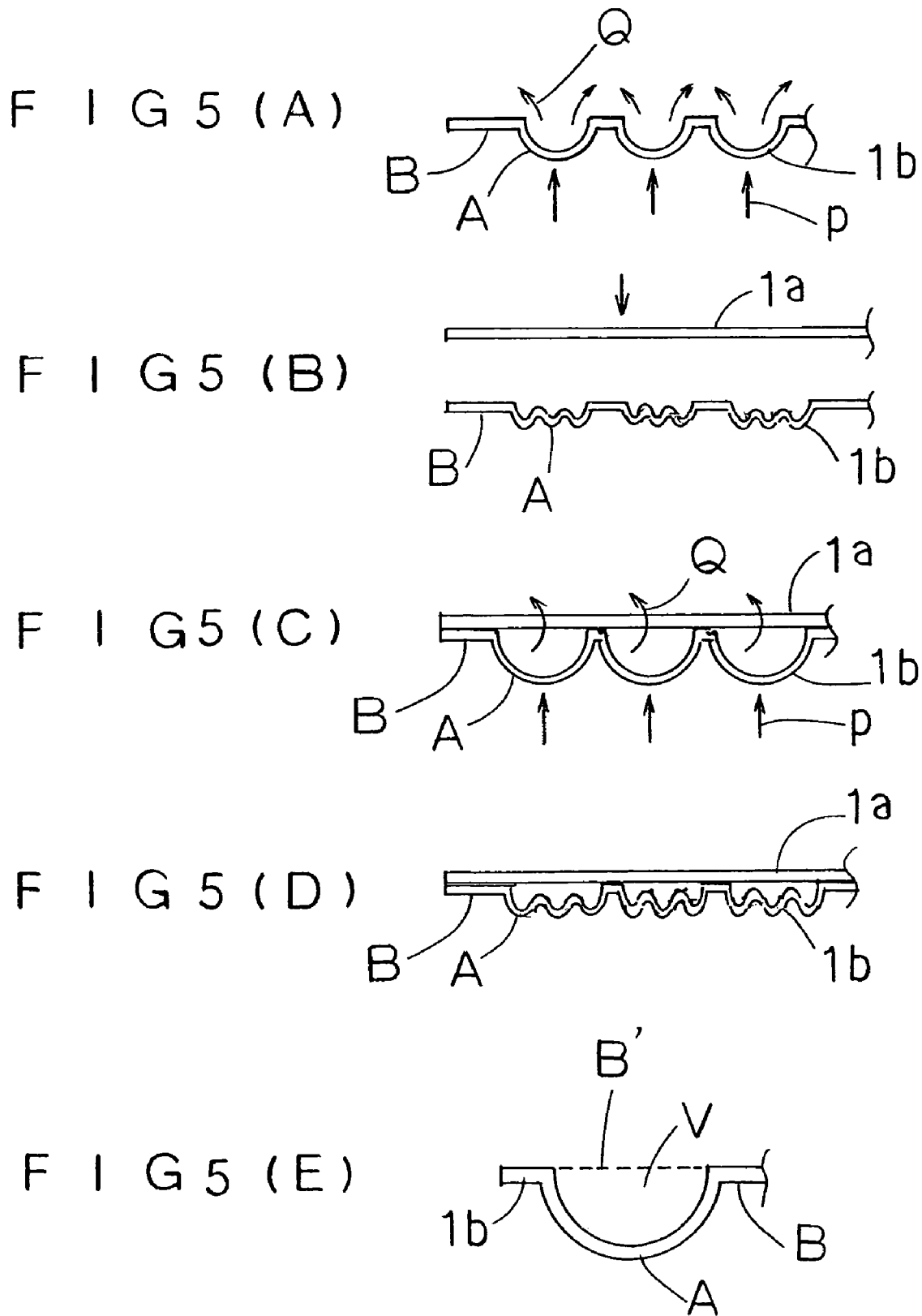
FIGS. 5(A) to 5(D) are explanatory drawings of sectional views showing a step of squashing a three-dimensional portion A in expansion.
FIG. 5(E) is an explanatory drawing showing an internal volume V of the three-dimensional portion A.

A concrete method is, as shown in FIG. 5(A), to reduce the internal volume V by squashing or folding the three-dimensional portion A in expansion of the other sheet 1b by applying a pressure P by a roller or the like, and release as much the air Q as this reduced internal volume, and thereafter, as shown in FIG. 5(B), to stick one sheet 1a to the other sheet 1b together. Anther method employed is, firstly to form seals 4 excluding a lower-end seal 4a shown in FIG. 1, then to reduce the internal volume V by applying a pressure P by a roller or the like as shown in FIGS. 5(C) and 5 (D), and release as much the air Q as this reduced internal volume, then to form the lower-end seal 4a. Thereby, a form in a sectional view along I-I of FIG. 1 can be made, as shown in FIG. 3(A), into a condition where the three-dimensional portion A is in a non-expanded state, and this can eliminate a problem even in processing an air-filling cushioning material 1 into a three-dimensional configuration or in shipping the same without filling air in the cells 2.

Prior to a step of overlapping one sheet 1a and the other sheet 1b, a step of disposing a sheet composing a check valve 3a between both sheets 1a, 1b may be provided.

In a case where the air-filling cushioning material 1 is shipped after air is filled beforehand in the cells 2, one sheet 1a and the other sheet 1b may be stuck together while air slightly remains in the cells 2.

The cells 2 of the other sheet 1b molded as described above are filled with air, as shown in FIG. 2, thus the three-dimensional portions A in expansion and flat portion B appear.

After one sheet 1a and the other sheet 1b are adhered with seals 4, when the cells 2 are not filled with air, a configuration in a sectional view along I-I of FIG. 1 becomes one shown in FIG. 3(A). At this time, since the three-dimensional portion A is in a non-expanded state, the other sheet 1b is disposed in a slackened manner against the flat sheet 1a.

Figure 2:
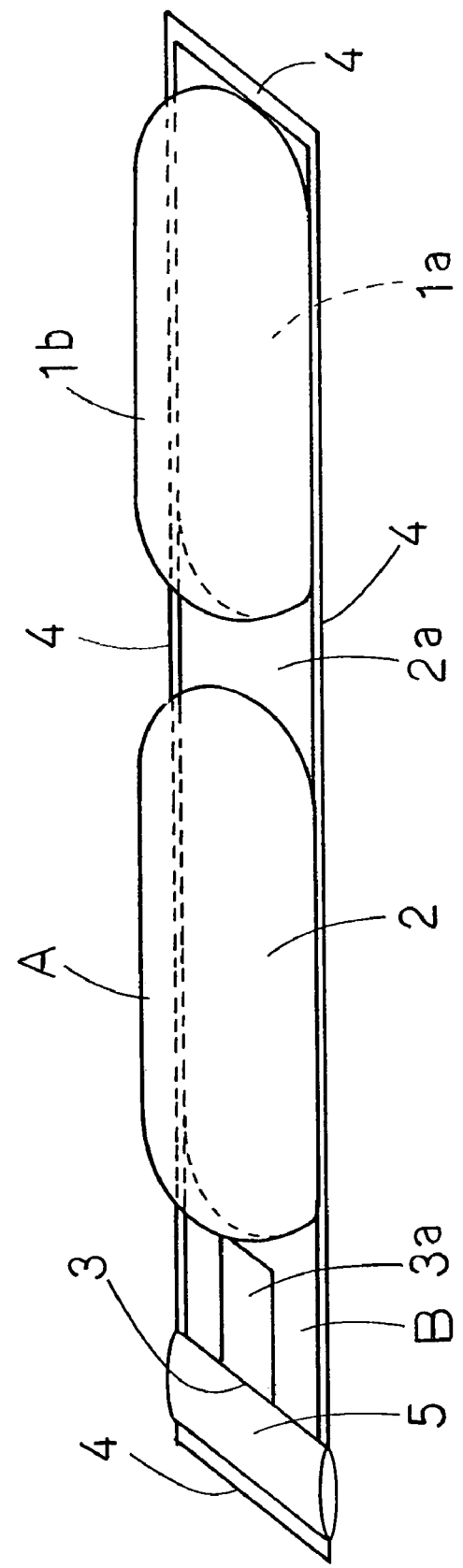
FIG. 2 is an oblique perspective explanatory drawing of a main part showing the vicinity of cells of an air-filling cushioning material of the present embodiment.
Figure 3B:
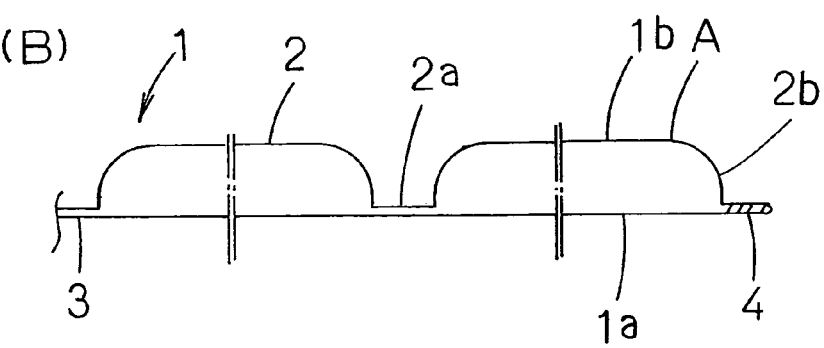
FIG. 3(B) is a sectional view along I-I of FIG. 1 after air-filling.
Figure 3C:
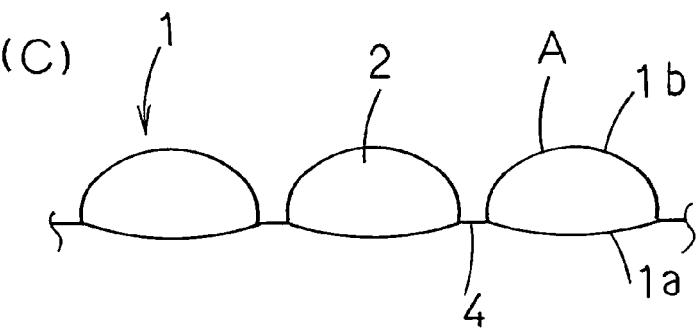
FIG. 3(C) is a sectional view (main part) along II-II of FIG. 1 after air-filling.

When the cells 2 are inflated by the air filled therein, as shown in FIGS. 2, 3(B) and 3(C), the three-dimensional portion A of the other sheet 1b is in expansion, whereas one sheet 1a hardly expands.

Figure 9:
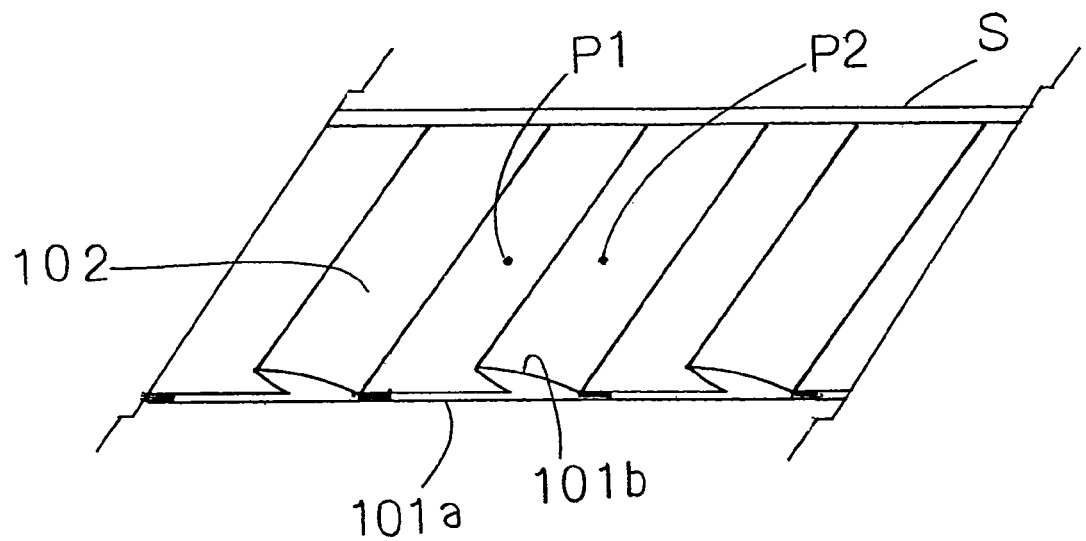
FIG. 9 is an explanatory drawing of a sectional and oblique perspective view showing the cells of the conventional air-filling cushioning material.

Herein, in the conventional air-filling cushioning material described in patent literature 1, as shown in FIG. 9, the other sheet 11b is tucked or pleated at the cells 102. So the cells 102 cannot be inflated sufficiently at the end portion S of the air-filling cushioning material. However, in the present invention, as shown in FIG. 3(B), end portions 2b of the cells 2 are positioned away from the seal 4. Thus, the cells 2 can be sufficiently inflated following into a configuration of the three-dimensional portion A of the other sheet 1b when filled with air.

Figure 6:
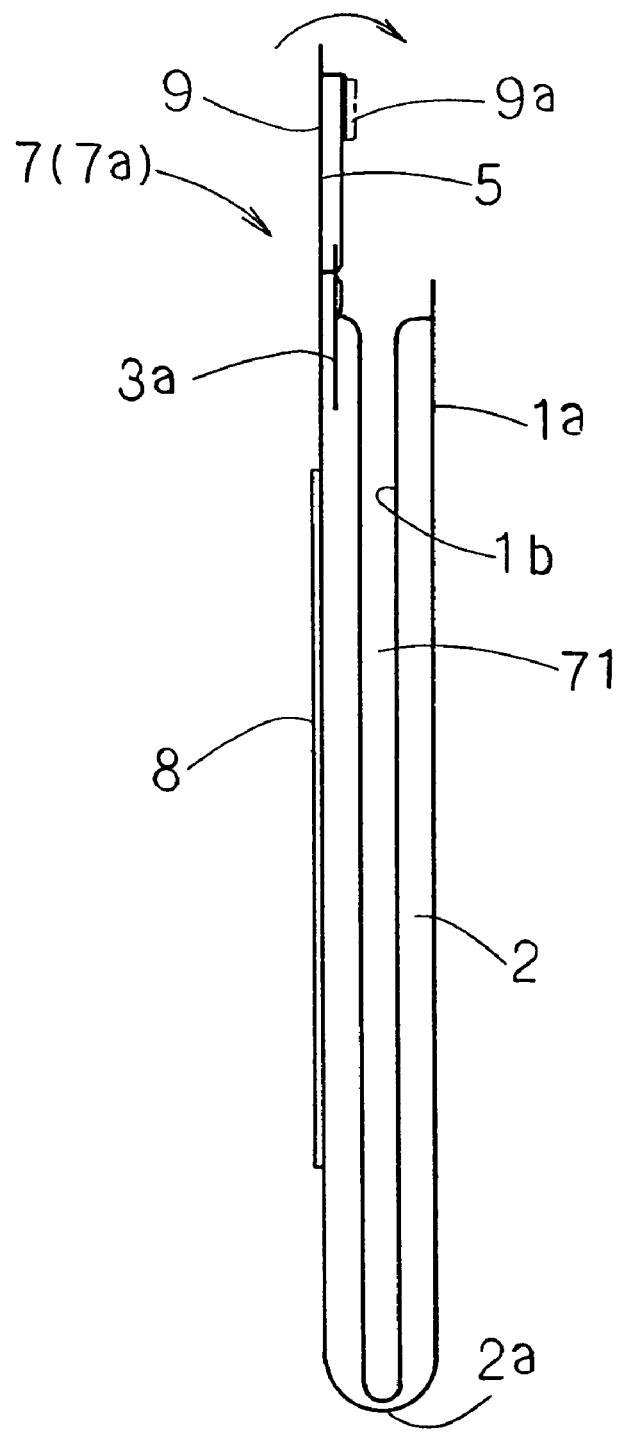
FIG. 6 is an explanatory drawing of a longitudinal sectional view showing an example where an air-filling cushioning material of the present embodiment has been formed into a three-dimensional configuration.
Figure 8:
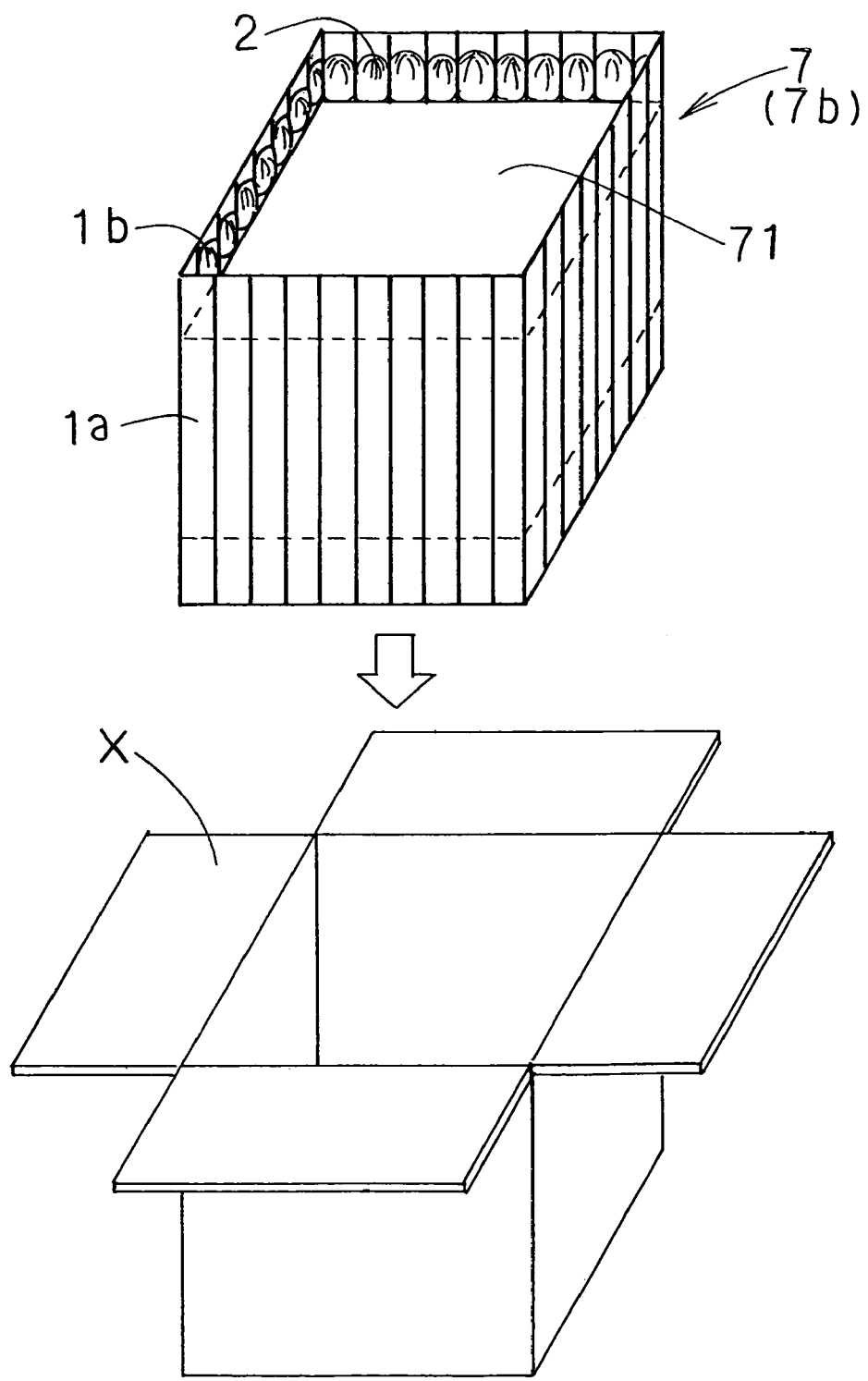
FIG. 8 is an explanatory drawing of an oblique perspective view showing another example where an air-filling cushioning material of the present embodiment has been formed in a three-dimensional configuration.

When a planar cushioning material 1 is folded and adhered at required spots into a three-dimensional configuration as shown in FIGS. 6 and 8, it is achievable for the outer dimension thereof not to change much due to filling of air in the cells 2 by forming the same so that one sheet 1a is disposed at the outer side.

In the conventional air-filling cushioning material, in which one sheet and the other sheet expand into an identical configuration, when this is formed into a three-dimensional configuration, the dimension must be determined in anticipation of the cells in inflation. However, in the present invention, such a thing is not necessary. Especially, in a three-dimensional cushioning material 7b shown in FIG. 8, a box-like cushioning material 7b can be disposed tight to a box member X where the cushioning material 7b is supposed to be laid. This is a considerable advantage for packing or doing something like that.

Now, back to FIG. 1, a cell 2 is opened at its upper end portion in the drawing as an air passage 3, and closed at its lower end portion by the seal 4(4a). In the present embodiment, a check valve 3a is attached as a closing means to the air passage 3, via which the cell 2 and an air-feeding path 5 to be described later are communicated.

Herein, without providing a check valve 3a for each cell 2 as in the present embodiment, for example, a check valve 3a may be provided at one side end 5a of the air-feeding path 5.

In the present invention, a check valve 3a is not necessarily provided. For example, after being filled with air in the cells 2, the air passage 3 may be closed by means of heat-sealing or the like. That is, it is sufficient to provide a closing means 3a for closing the air passage 3 after filling air in the cell 2 so that the filled air does not escape outside the air-filling cushioning material. A concrete means is not limited thereto accordingly.

Although not described in detail, the check valve 3a used in the present embodiment is made of a small piece of a soft resin sheet and has a flat and cylindrical shape where both ends are opened, thereby permitting an air-flow from one side end portion to the other, namely, an air-flow from the air-feeding path 5 to the respective cells 2 in the present embodiment, and checking an air-flow in the reverse direction. Exemplified is a check valve disposed with a valve body seat capable of closing an air passage inside the check valve 3a, or a check valve formed with a partial seal so as to increase resistance against an air-flow in certain direction becomes large in comparison with one in the reverse direction. The mode for carrying out the check valve 3a is, however, not limited to these examples, and various check valves can be used.

Since the check valve 3a is provided for each cell 2 in the air-filling cushioning material 1 of the present embodiment, even if one of the cells 2 is damaged, deflation arises only on the damaged cell 2. No influence is exerted on the other cells 2, and a cushioning effect of the air-filling cushioning material 1 can be maintained.

The air-feeding path 5 in the present embodiment is a band-like passage positioned at an upper side of the cells 2 in the drawing and formed in the horizontal direction so as to be orthogonal to the respective cells 2. This air-feeding path 5 is opened at the right end side thereof as an open end 5a, and is closed at the left end 5b thereof by a seal 4. This open end 5a serves as an inlet to feed air in the internal space of the cells 2.

In other words, the cells 2 are formed so as to branch off from the air-feeding path 5, and air is filled in the cells 2 from the open end 5a of the air-feeding path 5. Air can thus be filled in the cells 2 via the air-feeding path 5, achieving the efficient supply of air.

Here, a structure for filling air in the respective cells 2 direct from the outside of the air-filling cushioning material 1 may be employed, different from a structure via the air-feeding path 5 as in the present example.

Filling of air in the cells 2 of the air-filling cushioning material 1 formed as such is carried out by, for example, inserting a pipe or the like into the open end 5a of the air-feeding path 5. Thereby, air supplied by a pipe or the like passes through the air-feeding path 5 and reaches the respective cells 2 via the check valves 3a. In the present embodiment, since the check valves 3a are provided for the respective cells 2, the cells 2 can maintain an inflated condition after being filled with air.

In order for the cells to be inflatable or deflatable cell by cell, the check valve 3a may be attached so as to be operable to open from the outside of the air-filling cushioning material 1, or an opening and closing means such as a fastener may be provided on the respective cells 2, whereby some usage can be possible, such as inflating the cells 2 only at necessary portion, or reusing the deflated air-filling cushioning material 1 by deaering the air-filled cells 2 after use and refilling air again.

A slit may be formed beforehand on the air-filling cushioning material 1 so that the cells 2 can be torn from the slit in dumping. Or a cover, e.g. a detachable one, for a deaering opening portion may be provided on the cell 2 so as to deflate the cell 2 easily, reducing the same in volume.

Herein, in the present embodiment, a cell-to-cell air passage 2a is formed, between the cells 2 disposed in the vertical direction as shown in FIG. 1, by overlapping the flat sheet 1a and a flat portion B of the other sheet 1b. When the cells 2 are being filled with air, which preferentially accumulates in the cells 2 that have been formed beforehand to an after-inflation shape, this cell-to-cell air passage 2a does not relatively expand to the cells 2 as shown in FIG. 3B.

Conventionally, in a case where an air-filling cushioning material with a planar form as shown in FIG. 1 is folded in a manner to cross the cells into a three-dimensional configuration like an envelop, the crease that is created by simple folding may not keep its shape due to the air filled in the cells 2. And, in some cases, heat-sealing, or so-called spot seal, is partially formed as a fold in the cells. With a resin layer without heat-sealabiltiy being used for the outermost layer in the other sheet, when the other sheet is tucked, it is impossible for the overlapped non-heatsealable resin layer to be formed with a spot seal. (shown as point P2 in FIG. 9).

In the present invention, contrary to that, the cell-to-cell air passage 2a that does not relatively expand to the cells 2 have been formed. So, even in the case where an air-filling cushioning material 1 is formed into a three-dimensional configuration by folding at the cell-to-cell air passage 2a, unlike the conventional art, the crease may not lose its shape against the air filled in the cells. In addition, it is not necessary to form a spot seal as a fold.

Figure 7:
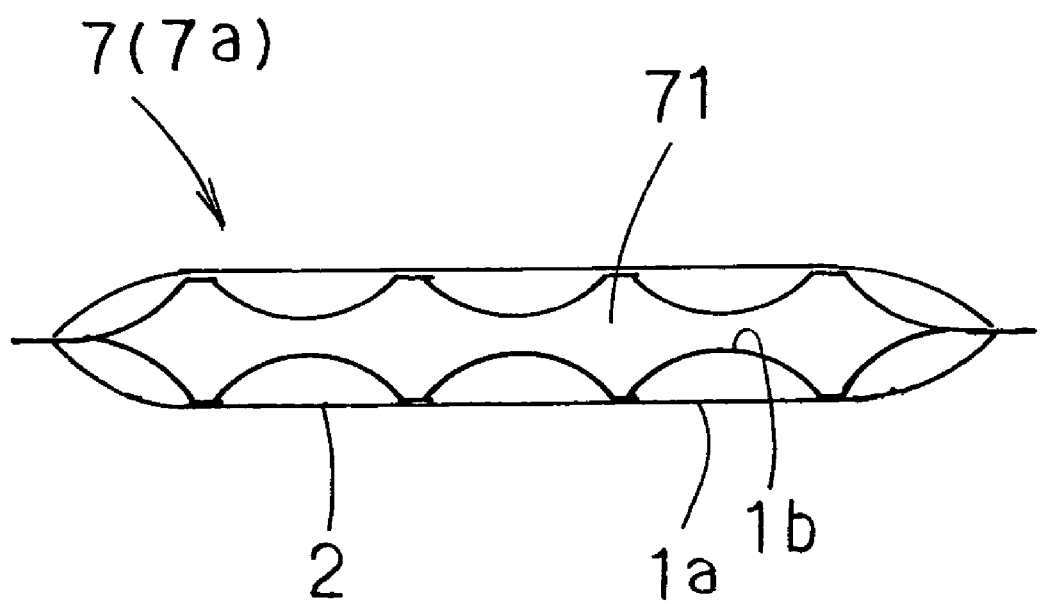
FIG. 7 is an explanatory drawing of a cross sectional view showing an example where an air-filling cushioning material of the present embodiment has been formed into a three-dimensional configuration.

The planar air-filling cushioning material 1 formed as shown in FIG. 1 can be utilized to process the same in various modes. The air-filling cushioning material 1 may be used by filling air in the cells 2 while maintaining this planar configuration shown in FIG. 1. Or, as shown in FIGS. 6 to 8, the air-filling cushioning material 1 may be formed into a three-dimensional cushioning material 7 having a space 71 thereinside.

Now, an air-filling cushioning material 7 formed into a three-dimensional configuration will be exemplified. First, for the envelop-like cushioning material 7a shown in FIGS. 6 and 7, the planar air-filling cushioning material 1 shown in FIG. 1 is folded in two at the cell-to-cell air passages 2a, adhered along the overlapped right and left sides by heat-sealing or the like, formed into an envelop shape where one sheet 1a is supposed to be positioned at its front side. In such a manner, a space 71 is formed so as to be surrounded by the air-filled cells 2 in inflation. And, by putting an article to be protected in this space 71, the cells 2 envelope the article that thus can be protected.

Herein, since one sheet 1a is disposed at the outer side, the outer surface can stay level even when air is filled in the cells 2. Accordingly, when a writable covering material such as paper is applied to the whole or part of the surface of the sheet 1a, the air-filling cushioning material 7 may be used almost like a normal envelop in respect of its usability.

Also, while the part of the air-feeding path 5 has been formed as a cover body 9 able to be folded back to the opposite side as shown by an arrow in FIG. 6, an adhesive layer 9a may be provided at the inner side of the cover body 9. The adhesive layer 9 can be adhered to one sheet 1a where the cover body 9 fits when folded back.

Next, FIG. 8 shows a three-dimensional cushioning material 7b molded in accordance with the inner shape of a box member X such as a corrugated cardboard case so as to be disposed thereinside. In this three-dimensional cushioning material 7b, one sheet 1a is as well disposed at the outer side while the other sheet 1b at the inner side. As previously mentioned, as a result of the sheet 1a being disposed at the outer side, the outer dimension does not much change against the air filled in the cells 2. Therefore, unlike the conventional air-filling cushioning material, it is not necessary to determine the dimension in anticipation of the cells in inflation, when this cushioning material is formed into a three-dimensional configuration. And, the three-dimensional cushioning material 7b can be disposed tight to the box member X, whereby a sufficient cushioning effect can be provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air-filling cushioning material, comprising:
   a pair of overlapped sheets, said pair of overlapped sheets being adhered together at predetermined locations to form a plurality of cells having an air-fillable space, one of the overlapped sheets being flat, the other of the overlapped sheets being molded in a die to plastically deform said other sheet to have a configuration that the cells will have in an inflated state;
   an air passage for connecting the outside of the air-filling cushioning material and the cells, and a closure that closes the air passage; and
   a cell-to-cell air passage provided between the cells in a place where the overlapping sheets stay non-adhered, wherein the cell-to-cell air passage is adapted to remain in a substantially non-expanded state when air is filled in the cells, so that it becomes easy to fold the overlapping sheets at the cell-to-cell air passage, and when the overlapping sheets are folded at said cell-to-cell air passage, the cushioning material is formed into a three-dimensional configuration so that one of the overlapping sheets is disposed at an outer side while the other of the overlapping sheets is disposed at an inner side, said three-dimensional configuration having a space adapted to receive an article, wherein a shape of an outer dimension in the three-dimensional configuration remains substantially constant without regard to whether or not the cells are filled with the air, and wherein ends of the plurality of the cells are not pleated.

2. The air-filling cushioning material as set forth in claim 1, wherein a writable covering material is provided on at least part of the outer surface side of one sheet.

3. The air-filling cushioning material as set forth in claim 1, wherein a check valve is provided in the air passage, said check valve permitting an air-flow from the outside of the air-filling cushioning material to the cells and checking an air-flow in a reverse direction opposite to the above.

4. The air-filling cushioning material as set forth in claim 2, wherein a check valve is provided in the air passage, said check valve permitting an air-flow from the outside of the air-filling cushioning material to the cells and checking an air-flow in a reverse direction opposite to the above.

5. The air-filling cushioning material as set forth in claim 2, wherein the writable covering material is paper.

6. An air-filling cushioning material, comprising:
a pair of overlapped sheets, said pair of overlapped sheets being adhered together at predetermined locations to form a plurality of cells having an air-fillable space, at least one of the overlapped sheets being molded in a die to plastically deform said molded sheet to have a configuration that the cells will have in an inflated state;

an air passage for connecting the outside of the air-filling cushioning material and the cells, and a closing means for closing the air passage; and a cell-to-cell air passage provided between the cells in a place where the overlapping sheets stay non-adhered, wherein the cell-to-cell air passage is adapted to remain in a substantially non-expanded state when air is filled in the cells, so that it becomes easy to fold the overlapping sheets at the cell-to-cell air passage, and when the overlapping sheets are folded at said cell-to-cell air passage, the cushioning material is formed into a three-dimensional configuration so that one of the overlapping sheets is disposed at an outer side while the other of the overlapping sheets is disposed at an inner side, said three-dimensional configuration having a space adapted to receive an article, wherein a shape of an outer dimension in the three-dimensional configuration remains substantially constant without regard to whether or not the cells are filled with the air, and wherein ends of the plurality of the cells are not pleated.

7. The air-filling cushioning material as set forth in claim 6, wherein a check valve is provided in the air passage, said check valve permitting an air-flow from the outside of the air-filling cushioning material to the cells and checking an air-flow in a reverse direction opposite to the above.

* * * * *